United States Patent Office 3,027,125
Patented Mar. 27, 1962

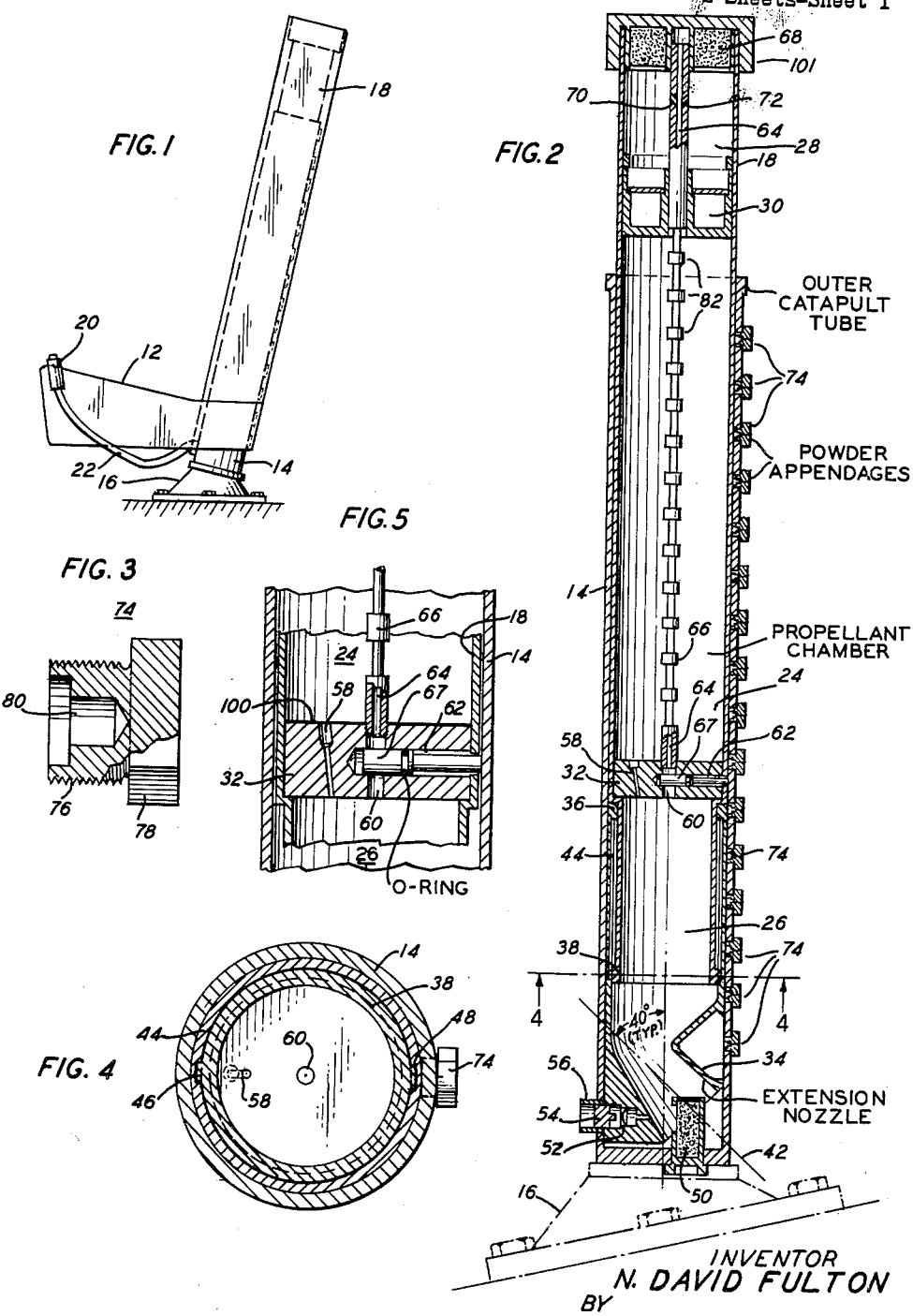

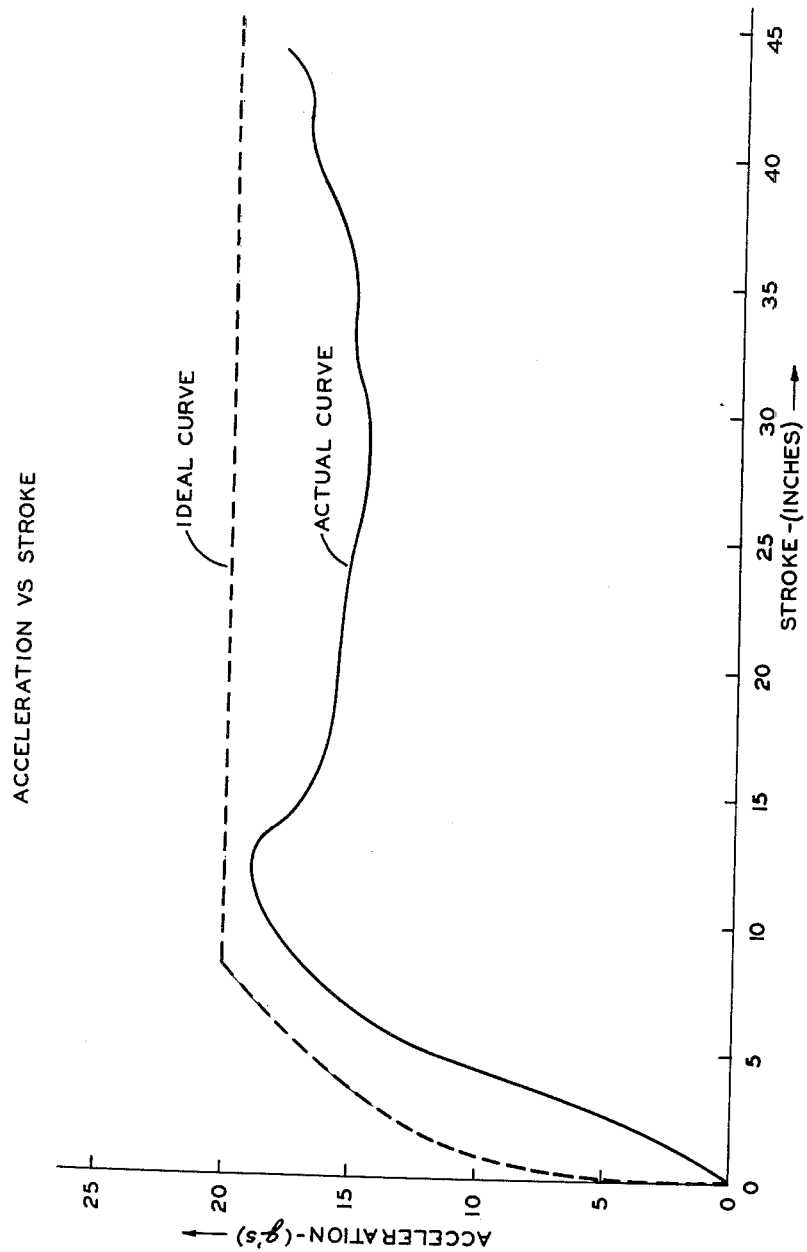

3,027,125
PROPULSION SYSTEM
Nathaniel David Fulton, Bernardsville, N.J., assignor, by mesne assignments, to Hydro-Space Technology Incorporated, Wilmington, Del., a corporation of Delaware
Filed Dec. 21, 1959, Ser. No. 860,788
7 Claims. (Cl. 244—122)

This invention relates to propulsion systems, and more particularly to such systems which utilize controlled explosions or rocket propulsion.

In the field of ejection seats for airplane pilots, it is customary to use a single solid propellant charge to catapult the pilot and his seat out of the airplane. Two concentric slidable tubes are generally used, and the ejection seat is secured at its upper end to the inner tube. When the solid propellant within the tubes is ignited, the inner tube or piston is ejected from the outer tube, carrying the seat and pilot along.

The problem of safely ejecting pilots from the higher speed jet planes which are now being used is considerably more difficult than with the older and slower propeller planes. At higher speeds the ejection velocity must be increased so that the pilot will clear the tail of the plane. In addition, the rapid deceleration which occurs when the pilot hits the air may be fatal, unless special precautions are taken.

A previous system which I designed to solve this problem employs a rocket motor as the inner tube. The rocket motor, usually of the solid propellant type, ignites just before separation of inner and outer tubes, and provides continued thrust to the man and seat after separation from the aircraft. The rocket nozzle is canted in this arrangement so as to provide a forward component of thrust in addition to the upward component. The forward component of trust opposes the deceleration forces of the air stream and aids in tail clearance. As in earlier systems, a single solid propellant charge ejected the inner tube from the outer tube, and the rocket action assist started at the time the inner tube separated from the outer tube.

The use of a single solid propellant charge for ejection is not satisfactory under jet airplane conditions. The reason lies in the temperature sensitivity of solid propellant charges, combined with the limited tolerance requirements for jet ejection. One controlling factor is the upper acceleration limit of 20 $g$'s, where "$g$" represents the acceleration provided by gravity, which the human spinal column can barely tolerate. On the other hand, if the ejection acceleration is much less than 20 $g$'s, the pilot is likely to be hit by the tail assembly of the airplane. The acceleration provided by a solid propellant varies by as much as sixty percent over the range of temperatures required for military aircraft. Accordingly, if the charge is made too small, under cold temperature conditions the acceleration will be so low that the pilot will not attain sufficient ejection velocity. However, if the charge is made larger, in hot climates the pilot may have his spinal column damaged by accelerations in excess of 20 $g$'s.

An important object of the present invention is to reduce the temperature sensitivity of solid propellant type systems.

Another object of the invention is to accelerate a piston by propellant methods rapidly and at a uniform rate of acceleration.

Another object of the invention is to prevent explosions in case of accidental jamming of a piston in a propellant system of the type described above.

In accordance with an illustrative embodiment of the invention, the foregoing objects may be achieved by the use of a piston type propelling system in which a large number of charges spaced along the outer tube of the piston are successively unported as the piston moves down the tube. The hot gases within the tube ignite the successive charges, and their ignition provides the desired acceleration versus distance characteristic. Since the pressure developed by the system depends on the amount of propellant consumed and volume of combustion gases generated, a programmed pressure versus stroke characteristic can be established in accordance with the size and spacing of the propellant increments along the tube. This characteristic may be a high, nearly constant acceleration, and the charactertistic is only affected to a very slight extent by changes in temperature.

In one arrangement, the outer tube in which the piston moves is provided with a large number of tapped holes along its length. Threaded powder appendages, each including a cavity holding some gunpowder, are screwed into the openings. The cavities face the inside of the tube, and each is covered by a thin film of flammable material which burns away quickly, as the piston's movement exposes the cavity. To insure prompt ignition of the successive charges, it was found to be desirable to increase the cross-sectional area of the gunpowder adjacent the piston as compared with that in the remainder of the powder appendage. This may be conveniently accomplished by drilling holes in the powder appendages, and then countersinking the holes.

In accordance with a feature of the invention, therefore, a piston type propellant system may be provided with at least three cavities or recesses along its length, solid monopropellant is located in each of said cavities or recesses, and movement of the piston exposes additional increments of propellant to the hot gases which are moving the piston.

Another serious problem in ejection seat systems is ejection from low flying aircraft, particularly at takeoff or in the course of an unsuccessful landing. Even after successfully escaping the plane, the pilot may not be able to parachute safely to the ground if the plane is too low. One way to increase the ejection stroke is to mount a rocket motor on the ejection seat so that the thrust can continue even after the seat has left the aircraft. However, it is not desirable to have the rocket motor provide the initial thrust because of the dangers of explosions or fumes caused by a rocket motor exhausting inside the cockpit. Furthermore, a gun type catapult uses about one-fifteenth as much weight to impart a given velocity to an ejected mass as the weight required by a rocket motor.

Accordingly, a gun type catapult or powder train should be used in conjunction with a rocket for ejection. The gun type catapult or powder train provides thrust until the ejection seat leaves the cockpit; then the rocket motor begins to fire and provides additional upward velocity.

For many applications, the rocket motor can be stored within the catapult tube, initially. The rocket motor then acts as the catapult piston while it is in the tube and starts to fire as soon as it leaves the tube. This configuration is more compact than any having the rocket motor separate from the catapult tube.

It would seem to be an obvious simplification to have the rocket start to fire at the beginning of the ejection sequence. Thus, it might be expected that the portion of the propellant which burns within the tube could act as the ejection propellant, and there would be no break between tube operation and rocket operation. However, this is not possible in actual practice. The rate of gas production by the rocket is many times that needed in the tube. If the rocket is fired within the tube, excessively high pressures would be generated.

In accordance with another aspect of the present invention, therefore, an ejection seat is provided with an effective powder propellant catapult system such as the powder train described above, and also a simple liquid monopropellant rocket which is ignited when the rocket motor, acting as a piston, leaves the outer tube of the catapult.

The rocket motor, in the inner tube which is secured to the ejection seat, may include a principal combustion chamber and nozzle, a tank of monopropellant occupying most of the space in the rocket assembly, and a small piston for forcing the monopropellant through the injector into the principal combustion chamber. Above the small piston is a pressurization chamber where additional monopropellant is ignited and burned to force the monopropellant into the main combustion chamber. As the small piston moves to force the flow of propellant into the principal combustion chamber, additional monopropellant is supplied to the pressurization chamber above the piston. This action may be implemented by providing recesses in which monopropellant is entrapped, and successively exposing these recesses by the movement of the small pressurization piston. Alternatively, a differential piston type assembly may be employed in which monopropellant is contained within the assembly and is sprayed into the pressurization chamber as pressure is applied to the small piston to move it through the monopropellant tank. Such an arrangement is shown in a patent application of John O. Black, entitled "Propulsion System," Serial Number 860,795, filed December 21, 1959, with this specification.

It may be noted that the pressurization system mentioned above in which successive increments of monopropellant are exposed to the hot gases of a combustion chamber, is very similar in mode of operation to the powder train piston propulsion arrangement discussed at an earlier point in this specification. Accordingly, another feature of the invention contemplates a tube closed at one end, a piston slidably mounted in the tube, and arrangements for retaining several discrete successive small amounts of propellant along the length of the tube, and for exposing the propellant as the piston passes the points where the propellant is held.

In accordance with another spect of ejection seat design which requires consideration when a combined catapult and rocket system is employed, the force from the rocket nozzle should be applied along a line passing through the center of gravity of the loaded ejection seat. Otherwise, the thrust of the rocket will spin the seat. As noted above, the rocket motor is also the inner tube or piston for the ejection seat catapult, which extends along or through the back of the ejection seat. In order to apply force through the center of gravity of the ejection seat, therefore, the force from the rocket must be applied at an angle from the axis of the body of the rocket. This may be accomplished by tilting or canting the rocket nozzle with respect to the axis of the remainder of the rocket. In some installations, this may be accomplished by tilting the nozzle at an angle of 30 or 40 degrees with respect to the rocket axis. However, in certain other installations, the configuration of the ejection seat, cockpit and fuselage is such that angles of more than 45 degrees would be required in a normal installation. This situation is unsatisfactory, as excessive amounts of propellant are required to give the ejection seat sufficient elevation, when much of the power is lost in providing a forward component of velocity.

In accordance with another aspect of the present invention, these difficulties may be overcome by the use of an extension nozzle for the rocket. When such an extension nozzle is employed, the nozzle need only be canted over at an angle of less than 45 degrees even for the most adverse airplane geometry. This has the advantage of conserving propellant and power, and of utilizing the available propellant to obtain the necessary altitude for the pilot to insure a safe descent by parachute. A subordinate advantage includes the standardization of units for installation in a number of different planes, with slight adjustments in the terminal position of the extension nozzle, or in the length of the extension nozzle providing the degree of flexibility necessary to direct the rocket thrust through the center of gravity of the ejection seat.

It is a further feature of the invention that the ejection seat of an airplane be provided with a rocket having an extensible nozzle. Furthermore, this nozzle is preferably canted to the rear, away from the ejection seat, at an angle with respect to the axis of the rocket.

In accordance with an additional and comprehensive feature of the invention, an ejection seat system for low level escape from high speed aircraft includes a powder train catapult, a liquid powered rocket forming the inner tube of the catapult, and an extensible nozzle attached to the combustion chamber of the rocket.

This overall assembly has the many advantages of a fast and accurately controlled initial ejection action, an ultimate elevation sufficient to insure safe parachute descent, overall economy of space, and a minimum degree of complexity, considering the functions which must be performed in an accurate and precise manner.

Other objects, features and advantages of the invention will become apparent from a consideration of the following detailed description and from the attached drawing, in which:

FIGURE 1 shows an ejection seat mounted on a catapult and its associated bracket;

FIGURE 2 shows the construction details of one illustrative powder train catapult and liquid powered rocket, in accordance with the present invention;

FIGURE 3 is a detailed view of one of the powder train appendages employed in the assembly of FIGURE 2;

FIGURE 4 is a cross sectional view taken along lines 4—4 of FIGURE 2;

FIGURE 5 is an enlarged view of a portion of the structure shown in FIGURE 2; and FIGURE 6 is a plot of acceleration against stroke or distance for a powder train propulsion system of the type shown in FIGURE 2.

With reference to the drawings, FIGURE 1 shows an ejection seat 12 which is provided with an ejection system in accordance with the present invention which consists generally of an outer tube 14, extending upwardly from the supporting bracket 16 into the back of the ejection seat, and an inner tube 18 which is rigidly secured to the ejection seat 12 by means of trunnions or other suitable attachment means. The inner tube 18 may be alternatively referred to as the piston or rocket motor. A manual mechanism 20 is provided to initiate operation of the ejection system. The actuator 20 may include a conventional gas generating cartridge. The generated gas is applied to the initiating mechanism in the base of the outer catapult tube 14 through the connecting tube 22.

FIGURE 2 shows the construction of the catapult and rocket in some detail. In FIGURE 2, the inner tube or piston 18 is shown slidably mounted within the outer tube 14. The outer tube is, of course, rigidly secured to the frame of the aircraft by the bracket 16.

The principal components of the ejection system of FIGURE 2 include the monopropellant chamber or tank 24, the principal combustion chamber 26, and the upper pressurization combustion chamber 28. The movable piston assembly 30 separates the pressurization and the monopropellant chambers. Similarly, a fixed wall or injector plate 32 separates the monopropellant tank 24 and the main combustion chamber 26.

The extension nozzle 34 is slidably secured to the outer wall of the principal combustion chamber 26. Following extension of the nozzle 34 so that the flange 36 at the upper edge of the nozzle assembly engages the flange 38 at the lower edge of the tube forming the inner wall of the combustion chamber 26, the axis 42 of the nozzle 34 is directed through the center of gravity of the entire loaded ejection seat assembly.

As shown to advantage in FIGURE 4, the side wall 44 of the extension nozzle assembly is provided with two grooves. Opposed projections 46 and 48 extend outwardly from the lower flange 38 of the main combustion chamber into these grooves to prevent rotation of the extension nozzle with respect to the rocket or the ejection seat.

Returning to FIGURE 2, a number of additional components have not yet been noted. At the base of the assembly, the primary charge 50 is mounted for ignition by the primer 52. The firing pin piston 54 is mounted within the initiation inlet port 56, in proximity to the primer 52. The tube 22 of FIGURE 1 is not shown in FIGURE 2, but it would normally be connected directly to the inlet port 56.

Note also that the firing pin piston 54 locks together the inner and outer tubes of the ejection system to prevent vertical movement of the seat 12 within the aircraft prior to actuation of the system, but upon actuation this piston is displaced by the gases generated from the cartridge 20 simultaneously unlocking the inner and outer ejection tubes and igniting the primary charge 50.

FIGURE 5 is an enlarged view of the injector plate 32 and its associated components. In FIGURE 5, the injector plate 32, which separates the monopropellant chamber 24 from the main combustion chamber 26, is provided with numerous openings or propellant injector holes. For simplicity only one of these injector holes 58 is shown. A central longitudinal hole 60 and a transverse hole 62 are also included in the injector plate 32 for the purpose of triggering rocket motor ignition as will be explained below. The central hole 60 extends through the injector plate and connects with the hole 64 which in turn extends the length of the central rod 66. A small piston 67 initially blocks the central hole 60. This piston is displaced during the ejection sequence, as further explained below, permitting hot gases in the chamber 26 to pass up through the center rod hole 64 and thence to the powder charge 68 contained in the head cap 101. These hot gases ignite the powder charge and thereby initiate rocket action.

Powder appendages 74 are secured through the outer tube 14 of the catapult, along its length. An enlarged view of one of the appendages 74 is presented in FIGURE 3. The appendage shown in FIGURE 3 includes a threaded portion 76 for engagement with a mating tapped hole in tube 14. The other end of the appendage 74 is provided with a standard hexagonal head 78 for ease in assembly. A countersunk opening 80 is provided to receive gunpowder. The enlarged cross sectional area of the opening facing the inside of tube 14 serves to promote rapid ignition and build up of pressure, following exposure of the opening to the hot gases below the inner tube which is being ejected. A thin film of flammable material is provided across the opening to hold the gunpowder in place during assembly, and prior to exposure by the movement of the inner tube piston 18.

Turning now to a consideration of the mode of operation of the ejection seat system, a complete cycle of operation will be considered. First, the pilot operates the conventional gas generating unit 20. The resultant gas pressure is transmitted through tube 22 as shown in FIGURE 1 to move the firing pin piston 54 as shown in FIGURE 2. The firing pin piston moves (to the right as shown) unlatching the outer and inner tubes to permit separation, and simultaneously firing the primer 52. The primer in turn ignites the primary charge 50.

Upon ignition of the primary charge 50, pressure builds up in chamber 26 and the entire inner rocket assembly with seat attached starts to move in the vertical direction as shown in FIGURE 2. Following a short movement of the inner tube 18, the first of the powder appendages 74 is unported, and its combustion increases the pressure forcing ejection of the inner rocket assembly. This action of the inner piston in successively unporting additional of the powder appendages 74, and causing their ignition, produces the desired high and nearly constant acceleration required to attain sufficient ejection velocity.

FIGURE 6 shows an ideal acceleration curve for an ejection seat catapult, and a plot of the actual acceleration versus distance which was obtained using a series of powder appendages as shown in FIGURE 3. The "Ideal" curve shows a moderately rapid increase in acceleration up to the maximum level of 20 $g$'s to which a human body can safely be subjected. The "Ideal" curve then levels out at this acceleration. The curves which have actually been obtained closely approximate the ideal curve, and can be further improved by the addition of powder appendages at the intermediate points along the length of the outer tube just prior to the region where the curve drops off somewhat, or by providing increased powder charges at these points. In this regard, it may be noted that one of the significant advantages of the present powder train propulsion system is the facility for providing virtually any desired acceleration versus stroke characteristics merely by varying the number of powder charges along the length of the piston tube, by providing additional appendages at desired points, or by providing charges of different magnitude at different points along the tube.

The initiation of operation of the rocket system will now be considered, with reference to FIGURE 2 and the enlarged view of FIGURE 5. When the opening 62 passes the upper lip of the outer catapult tube 14, the small piston 67 moves (to the right as shown) as a result of the difference in pressure between the chamber 26 and that of the atmosphere. The piston 67 shoulders on the wall of tube 18 thereby retaining it from further motion which would permit chamber gases to escape to the atmosphere. Hot gases from chamber 26 then pass up through passageway 64, through the openings 70 and 72 and ignite the propellant powder charge 68. Combustion of the charge 68 increases the pressure in chamber 28, bursts the rupture disc 100 on the propellant injector plate 58, and starts movement of piston 30 downward, forcing propellant from the monopropellant tank 24 into the principal combustion chamber 26 where it is ignited by the hot gases contained therein. It will be seen that the monopropellant cannot enter the injection holes 58 prior to actuation due to the presence of the burst diaphragm 100. As the piston 30 moves down, monopropellant is entrapped in the recesses 82 in the central rod 66 which extends through the monopropellant tank 24. The increments of monopropellant which are exposed to the pressurization combustion chamber 28 serve to maintain the pressure necessary to force the piston 30 downward. A constant high pressure forcing the monopropellant into the principal combustion chamber 26 is therefore obtained.

Alternatively, pressurization of the propellant tank can be provided by means of a differential piston gas generator in accordance with the disclosure of the Black specification cited above, the charge 68 can be ignited by a squib and the propellant injected into the main combustion chamber can be similarly ignited. The two electrical initiators can be actuated in the requisite sequence. The ignition features 64, 70, 72, 60, 62, and 67 would be absent in this arrangement.

Now that a detailed description of one illustrative embodiment of the invention is complete, a number of advantages of the invention will be restated. With respect to the overall assembly, important advantages include compactness, and economy of both cost and space, while providing sufficient immediate velocity for escape from high speed aircraft and sufficient total impulse to permit safe ejection from low flying aircraft. With regard to the propellant train arrangements, they have the advantage of providing an acceleration which is relatively insensitive to variations in temperature. This is in sharp contrast to the use of one or two solid propellant charges which have been proposed heretofore, and which are extremely temperature sensitive. The propellant train arrangements which employ a series of discrete charges have the additional advantage of eliminating an explosion hazard. Thus, if the piston becomes canted or locked in position for some other reason, the next successive increments of propellant are not unported, and the pressure behind the piston does not build up to explosive proportions. Both powder train and liquid train also provide the possibility of close control over thrust or acceleration, highly desirable in ejection and other applications. With regard to the extension nozzle, it reduces the storage space required by a rocket motor prior to firing while providing the necessary chamber volume after firing.

It is to be understood that the above-described arrangements are illustrative of the principles of the invention. Numerous other arrangements may be devised by those skilled in the art without departing from the spirit and scope of the invention.

What is claimed is:

1. A propulsion system comprising an inner piston having an opening therein, an enclosing outer tube closed at one end, an inner tube telescoping within the outer tube, said piston sliding in the inner tube, at least three increments of propellant located along the length of said outer tube and exposed to the space within said outer tube, an initiating charge exposed to the space between the piston and the closed end of said outer tube, an injector in the inner tube, and a fixed rod provided with recesses in which monopropellant is adapted to be entrapped, said fixed rod being encompassed in the opening in said piston.

2. In combination, an injection seat; inner and outer catapult tubes, said inner tube being secured to said seat and said inner tube housing a rocket motor; said rocket motor comprising a principal combustion chamber having a slidable extension nozzle therein; a monopropellant tank arranged above said principal combustion chamber, a pressurization combustion chamber arranged above said monopropellant tank; an injector disposed between the principal combustion chamber and the monopropellant tank for the passage of monopropellant; a piston assembly including a piston between the monopropellant tank and the pressurization chamber; means for supplying monopropellant to said pressurization chamber as said piston assembly moves; and means for initiating combustion in the pressurization chamber as said inner tube is separating from said outer tube.

3. In combination, an injection seat; inner and outer catapult tubes, said inner tube being secured to said seat and said inner tube housing a rocket motor; said rocket motor comprising a principal combustion chamber having a slidable extension nozzle therein which is canted at an angle of 30 to 40 degrees with respect to the axis of the inner tube; a monopropellant tank arranged above said principal combustion chamber; a pressurization combustion chamber arranged above said monopropellant tank; an injector disposed between the principal combustion chamber and the monopropellant tank for the passage of monopropellant; a piston assembly including a piston between the monopropellant tank and the pressurization chamber; means for supplying monopropellant to said pressurization chamber as said piston assembly moves; and means for initiating combustion in the pressurization chamber as said inner tube is separating from said outer tube.

4. In combination, an injection seat; inner and outer catapult tubes, said inner tube being secured to said seat and said inner tube housing a rocket motor; said rocket motor comprising a principal combustion chamber having a slidable extension nozzle therein which is canted at an angle of 30 to 40 degrees with respect to the axis of the inner tube; a monopropellant tank arranged above said principal combustion chamber; a pressurization combustion chamber arranged above said monopropellant tank; an injector disposed between the principal combustion chamber and the monopropellant tank for the passage of monopropellant; a piston assembly including a piston between the monopropellant tank and the pressurization chamber, said piston having an opening therein; means for supplying monopropellant to said pressurization chamber as said piston assembly moves; said means comprising a fixed rod having recesses along its length in which monopropellant is adapted to be trapped, said rod being encompassed by the said opening in said piston; and means for initiating combustion in the pressurization chamber as said inner tube is separating from said outer tube.

5. In combination, an ejection seat; inner and outer catapult tubes, said inner tube being secured to said seat; means including a plurality of propellant charges spaced along the length of said outer tube for ejecting said inner tube from said outer tube; a rocket motor in said inner tube, said rocket motor including a principal combustion chamber, an extension nozzle slidably secured to said principal combustion chamber, a monopropellant tank, a pressurization combustion chamber, said monopropellant tank and said principal combustion chamber being interconnected by an injector for the passage of monopropellant, a piston assembly between said monopropellant tank and said pressurization chamber, and means for supplying monopropellant to said pressurization chamber as said piston assembly moves; and means for initiating combustion in said pressurization chamber as said inner tube is separating from said outer tube.

6. In combination, an ejection seat; inner and outer catapult tubes, said inner tube being secured to said seat; means including a plurality of propellant charges spaced along the length of said outer tube for ejecting said inner tube from said outer tube; a rocket motor in said inner tube, said rocket motor including a principal combustion chamber, a monopropellant tank connected to said principal combustion chamber by an injector, a pressurization combustion chamber, a piston assembly between said monopropellant tank and said pressurization chamber, and means for supplying monopropellant to said pressurization chamber as said piston assembly moves; and means for initiating combustion in said pressurization chamber as said inner tube is separating from said outer tube.

7. In a combined catapult and rocket propulsion system, inner and outer catapult tubes, a complete rocket propulsion system including a principal combustion chamber in the inner tube, a nozzle having its axis canted with respect to the axis of the inner tube slidably attached to the principal combustion chamber, and means for limiting movement of said nozzle within said principal combustion chamber.

References Cited in the file of this patent

UNITED STATES PATENTS

| | | |
|---|---|---|
| 2,467,763 | Martin | Apr. 19, 1949 |
| 2,552,497 | Roach et al. | May 8, 1951 |
| 2,683,963 | Chandler | July 20, 1954 |
| 2,753,801 | Cumming | July 10, 1956 |
| 2,900,150 | Hirt et al. | Aug. 18, 1959 |